United States Patent
De Vos et al.

(10) Patent No.: US 6,311,466 B1
(45) Date of Patent: Nov. 6, 2001

(54) STEEL CORD WITH WAVED ELEMENTS

(75) Inventors: Xavier De Vos, Oudenaarde; Yvan Lippens, Anzegem; Albert R. Somers, Gentbrugge; Frans Van Giel, Kortrijk, all of (BE)

(73) Assignee: N. V. Bekaert S.A., Zwevegem (BE)

( * ) Notice: Subject to any disclaimer, the term of this patent is extended or adjusted under 35 U.S.C. 154(b) by 0 days.

(21) Appl. No.: 09/555,045

(22) PCT Filed: Nov. 25, 1998

(86) PCT No.: PCT/EP98/07548

§ 371 Date: May 24, 2000

§ 102(e) Date: May 24, 2000

(87) PCT Pub. No.: WO99/28547

PCT Pub. Date: Jun. 10, 1999

(30) Foreign Application Priority Data

Nov. 27, 1997 (EP) .................................. 97203712

(51) Int. Cl.$^7$ .............. D07B 1/06; D07B 7/02; D02G 3/02; D02G 3/36
(52) U.S. Cl. ................. 57/212; 57/902; 428/592
(58) Field of Search ............. 57/902, 212; 152/451; 428/592

(56) References Cited

U.S. PATENT DOCUMENTS

| | | | |
|---|---|---|---|
| 2,274,699 | 3/1942 | Jacobs | 140/71 |
| 3,805,853 | 4/1974 | Gladu | 140/105 |
| 5,020,312 | 6/1991 | Watakabe | 57/200 |
| 5,111,649 | 5/1992 | Watakabe | 57/311 |
| 5,581,990 | * 12/1996 | Van Giel et al. | 57/311 |
| 5,584,169 | * 12/1996 | Ikehara | 57/212 |
| 5,595,617 | * 1/1997 | Tonteling et al. | 148/595 |
| 5,606,852 | * 3/1997 | Yanagisawa | 57/207 |
| 5,843,583 | * 12/1998 | D'Haene et al. | 428/592 |

FOREIGN PATENT DOCUMENTS

| | | |
|---|---|---|
| 0 462 716 A1 | 12/1991 | (EP) . |
| 0 619 398 A1 | 12/1994 | (EP) . |
| 0 676 500 A1 | 10/1995 | (EP) . |
| WO95/16816 | 6/1995 | (WO) . |

OTHER PUBLICATIONS

Bourgois, L Survey of Mechanical Properties of Steel Cord and Related Test Methods, Tire Reinforcement and Tire Performance, ASTM STP 694, 1980, pp. 19–46.

* cited by examiner

Primary Examiner—Andy Falik
(74) Attorney, Agent, or Firm—Foley & Lardner (57) ABSTRACT

A steel structure adapted for the reinforcement of elastomeric members has steel elements containing a plurality of steel filaments at least one of which filaments is provided with first and second crimps. The first crimp lies in a plane that is substantially different from the plane of the second crimp. Application of the both crimps can be carried out efficiently using two pairs of toothed wheels which are not externally driven. This arrangement renders it possible to obtain steel structures with an increased penetration of rubber or with an increased elongation at break.

5 Claims, 4 Drawing Sheets

STEEL CORD WITH WAVED ELEMENTS

FIELD OF THE INVENTION

The present invention relates to a steel structure adapted for the reinforcement of elastomers such as rubber conveyor belts, rubber tyres, rubber hoses, rubber timing belts or timings in polyurethane. The steel reinforcement comprises one or more steel filaments.

The present invention also relates to a method of treating a steel filament so that the steel filament receives a spatial wave form.

BACKGROUND OF THE INVENTION

Such steel structures are widely known in the art. Recent prior art documents have disclosed a tendency towards steel structures where the steel filaments present one or another type of waviness, i.e. where, in addition to the plastic deformation as a consequence of the possible twisting of the steel filaments, the steel filaments have another plastic deformation. This additional and other plastic deformation is conveniently a consequence of a preforming operation, and results in a wavy pattern on the steel filament.

In this way U.S. Pat. No. 5,020,312 (Kokoku—priority 1989) and U.S. Pat. No. 5,111,649 (Kokoku) disclose steel cord structures consisting of three to five steel filaments. At least one steel filament is provided with a so-called 'crimp': this is a zigzagged form with relatively sharp angles, the sharpness depending upon the formation tools. The crimp is a planar wave form and is formed by means of two toothed wheels. The holes created at the level of the angles promote penetration of elastomer into the steel cord structure.

Another wave form has been disclosed in EP-A-0 462 716 (Tokusen—priority 1990). According to this document, the steel cords have three to twenty-seven steel filaments, 25% to 67% of which have a particular helix or helicoidal form. The plastical helix deformation is carried out by means of rotating preforming pins. The purpose is to promote penetration of the elastomer into the steel cord structure without increasing the so-called part load elongation (PLE, for definition see below). These steel cords are marketed under the name SPACY® cord. An important drawback of this cord is that its manufacture is energy-consuming or inefficient or both. Indeed, if the pitch of the helix is taken smaller than the twist pitch, then the rotation speed of the preforming pins must be more than twice as high as the rotation speed of a down-stream double-twister.

Still another wave form has been disclosed in WO-A-95/16816 (Bekaert—priority 1993). According to this document, the steel structure comprises steel filaments and at least one steel filament has been polygonally preformed. This is a spatial wave form and is the result of a preforming device with varying radii of curvature. The steel structures are marketed under the name BETRU®.

SUMMARY OF THE INVENTION

It is an object of the present invention to provide still another wave form to steel filaments of steel structures. It is another object of the present invention to provide a wave form to steel filaments where the wave form combines advantages of existing wave forms. It is still another object of the present invention to provide a wave form which can take a lot of specific forms depending upon the choice of the parameters of the wave form.

It is yet another object of the present invention to provide a wave form, the manufacture of which does not necessitate energy-consuming tools.

It is also an object of the present invention to provide a steel structure with an oval transversal cross-section as a consequence of the wave form of some filaments, e.g. a core filament.

According to the invention, there is provided a steel structure adapted for the reinforcement of elastomers. The steel reinforcement comprises one or more steel elements. At least one of these steel elements is provided with a first crimp and a second crimp. The first crimp lies in a plane that is substantially different from the plane of the second crimp.

In this way a spatial wave form is obtained without using driven and energy-consuming preforming tools.

Another advantage of this steel structure is that a lot of wave forms become possible. Indeed, the first crimp has a first crimp pitch and a first crimp amplitude. The second crimp has a second crimp pitch and a second crimp amplitude. This means already four design parameters which each can be varied, independently of each other over a certain range.

The first crimp pitch may be equal to or different from the second crimp pitch. With equal crimp pitches circular or oval spatial helixes can be obtained. Different crimp pitches, however, lead to spatial forms different from helixes.

The first crimp amplitude may be equal to or different from the second crimp amplitude. A different crimp amplitude enables to obtain a spatial form with an oval transversal cross-section on condition that the filament which is provided with the first crimp and the second crimp is not rotated around its own axis in the final steel structure. Still another parameter which can be varied is the angle between the two planes. It is preferable, however, that the planes differ as much from each other as possible: so the best choice is a maximum difference of about 90°.

The steel element of the steel structure according to the invention can be a steel filament, a bundle of non-twisted steel filaments or a steel strand of twisted steel filaments. The steel structure according to the invention may also be constituted by any combination hereof.

The steel structure may be an untwisted structure consisting of one or more steel filaments lying parallel adjacent to each other and bound by each other by means of another wrapping filament or by means of an adhesive that is compatible with the elastomer to be reinforced. An alternative embodiment is that the steel filaments lie nearly parallel adjacent to each other, which can be obtained by twisting them with a very large twist pitch e.g. by passing them at a relatively high linear speed through a twisting apparatus rotating at a convenient or relatively low rotation speed.

The steel structure may also be a twisted structure with some or all of the composing filaments twisted in to a coherent structure.

At least one of the first crimp pitch and the second crimp pitch is preferably smaller than the twist pitch of the steel filament provided with the first and the second crimp.

Within the general group of twisted structures, a first application of the invention are nx1 steel cords, i.e. cords essentially consisting of two to five steel filaments. In a first embodiment, some but not all of these filaments are provided with the first and the second crimp in order to allow rubber penetration. An example is a 4×0.28 cord with one or two filaments provided with the first and the second crimp. Such a cord is used in the breaker plies of a tyre. In a second embodiment, all of the filaments are provided with the first and the second crimp in order to increase the elongation at break above 5% or more. An example is a 5×0.38 cord with the five filaments provided with the first and second crimp. An additional advantage is that the cord may be twisted with a relatively large twist pitch (14 mm to 20 mm) without decreasing substantially the elongation at break. Another example are 4×0.22 and 5×0.22 where all filaments are provided with the first and the second crimp. These high elongation cords are suitable for reinforcing tyres of a motor cycle (lying at nearly 0° with respect to the equatorial plane of a motor cycle tyre).

A second application of the invention are the so-called l+m (+n) steel cords comprising a core of 1 core steel filaments and a layer of m steel filaments twisted around the core. Additionally, a second layer of n steel filaments may be twisted around the first layer of m filaments.

One or more core steel filaments may be provided with the first and the second crimp in order to:

a) increase the penetration of the elastomer into the core; and/or to b) obtain an oval transversal cross-section of the core, and as a consequence, an oval transversal cross-section of the whole cord; and/or to c) prevent the core steel filaments from migrating out of the cord. An example is a 1+6 construction, where the single core filament is provided with a first crimp and a second crimp in order to enable rubber penetration and in order to increase the anchorage of the single core filament in the cord, i.e. to prevent core migration. The first crimp amplitude may be greater than the second crimp amplitude so that an oval transversal cross-section is obtained. Another example is a 3+8+13 construction, where the three core filaments are provided with a first crimp and a second crimp in order to allow rubber penetration to the centre between the three core filaments. A similar application is the replacement of the core filaments of the strands in a 7×7 construction by a 2×1 or 3×1 element where the two or the three filaments are provided with the first and the second crimp. Still another example is replacing the well-known construction 3×d+9×d+15×d by a 5×d$_1$+9×d+15×d, where the filament diameter d1 of the core filaments is smaller than the diameter d of the other filaments. The core filaments are provided with the first and the second crimp. Rubber penetration and elongation are increased and the stiffness is decreased.

A third application of the invention is the so-called nx1 compact cords comprising n steel filaments which have been twisted with each other in the same twist sense and with the same twist pitch. An example is a 3×0.365|9×0.345 CC (CC=compact cord) where all the core filaments are provided with the first and the second crimp in order to provide rubber penetration and in order to prevent core migration. Another example is a 12×0.38 CC where all twelve filaments are provided with the first and the second crimp in order to obtain a high elongation. Such a cord can be used as the weft or warp element in a woven structure adapted to reinforce rubber conveyor belts.

A fourth application is the multi-strand steel cord, which is a steel cord comprising two or more strands and where each strand consists of two or more filaments. If such strands are twisted in the cord in the same sense as the filaments are twisted in the strand (the so-called Lang's lay cords) a high elongation at break can be obtained. A condition hereto is that relatively small twist pitches are used. According to the invention, however, if some or preferably all filaments are provided with the first crimp and the second crimp, then much larger twist pitches are possible without loosing any elongation at break, and thus cords are possible which can be manufactured in a more efficient way. It is also possible, still according to the invention, to combine the existing small twist pitches with a first and second crimp applied to all steel filaments. This allows to obtain a still higher elongation at break. The unavoidable loss in tensile strength and breaking load can be compensated by using an addition strand as core. The filaments of this core strand can also be provided with the first and second crimp.

A fifth application is a multi-strand steel cord, e.g. for use as reinforcement of conveyor belts, where the strands as a whole are provided with a first crimp and a second crimp, e.g. in order to obtain a rubber penetration between the strands.

According to another aspect of the invention, there is provided a method of giving to a steel filament a spatial wave form. The method comprises the following steps:

(a) applying a first crimp to said steel filament, said first crimp lying in a first plane;

(b) applying a second crimp to said steel filament, said second crimp lying in a second plane substantially different from said first plane.

BRIEF DESCRIPTION OF THE DRAWINGS

The invention will now be described into more detail with reference to the accompanying drawings wherein FIG. 1 schematically illustrates how a first and a second crimp are provided to a steel filament.

DESCRIPTION OF THE PREFERRED EMBODIMENTS OF THE INVENTION

Figure 1:
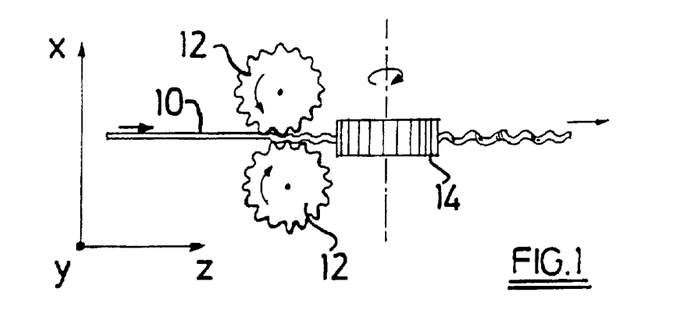

FIG. 1 schematically illustrates how a first crimp and a second crimp are provided to a steel filament 10. The steel filament 10 is moved downstream towards a first pair of toothed wheels 12. The axes of rotation of toothed wheels 12 lie parallel to the y-axis, and the first crimp given is a planar crimp lying in plane xz.

The thus crimped filament 10 is further moved to a second pair of toothed wheels 14. The axes of rotation of toothed wheels 14 lie parallel with the x-axis. The second crimp given by toothed wheels 14 is also a planar crimp and lies in plane yz. Obviously the resulting wave given to the steel filament 10 is no longer planar but spatial.

Neither the first pair of toothed wheels 12 nor the second pair of toothed wheels 14 need to be driven by external means. They are both driven and rotated by the passing steel filament 10.

It is important that the second pair of toothed wheels 14 is positioned as close as possible to the first pair of toothed wheels 12 in order to prevent the first crimp from tilting or rotating from plane xz to plane yz under influence of the second crimp. From a more general point of view and in order to control the two crimps given to the filaments, the bending moment, i.e. the moment necessary to give the two crimps, must be kept as small as possible. This can be done, e.g. by applying first the crimp with the smaller amplitude and only thereafter the crimp with the greater amplitude. Still from a more general point of view, the torsion moment, i.e. the moment necessary to rotate the filament, should be kept as high as possible, since the rotating of the filament must be prevented during or between the two crimping operations. One way to keep the torsion moment as high as possible is the above-mentioned minimum distance between the two pairs of crimping wheels.

A third and following pairs of toothed wheels may be provided in other planes or in the same planes. In this way the spatial structure obtained by the subsequent crimping operations may be optimised or varied to a further degree.

Figure 2:
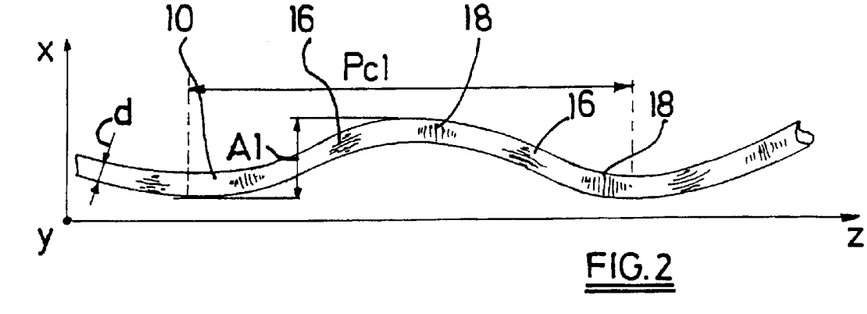
FIG. 2 shows the first crimp given to a steel filament.
Figure 3:
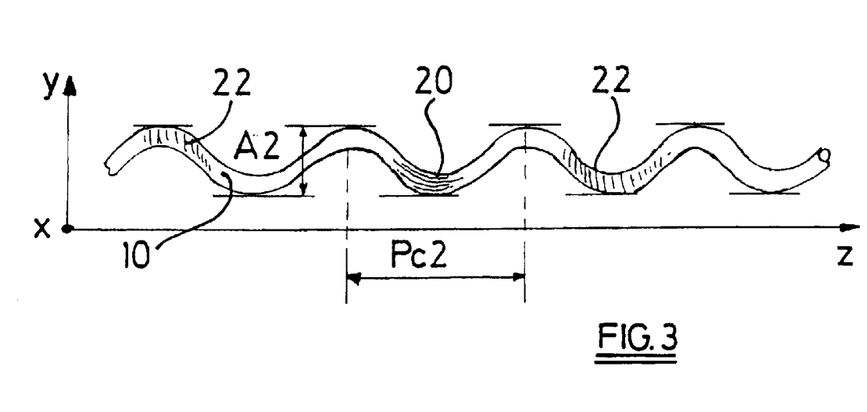
FIG. 3 shows the second crimp given to a steel filament.

FIG. 2 shows the first crimp lying in plane xz and FIG. 3 shows the second crimp lying in plane yz. The first crimp has a first crimp amplitude $A_1$, which is measured from top to top, with inclusion of filament diameter d. The first crimp has a first crimp pitch $P_{c1}$, which is equal to the distance between two minima of the first crimp. The second crimp has a second crimp amplitude $A_2$, which is measured from top to top, with inclusion of filament diameter d. The second crimp has a second crimp pitch $P_{c2}$. which is equal to the distance between two minima of the second crimp. The spots 16 where the second crimp reaches its maxima are hatched in parallel with the axis of the steel filament 10, and the spots 18 where the second crimp reaches its minima are hatched vertically in FIG. 2. The spots 20 where the first crimp reaches its maxima are hatched in parallel with the axis of the steel filament 10, and the spots 22 where the first crimp reaches its minima are hatched vertically in FIG. 3. Both the first crimp amplitude $A_1$ and the second crimp amplitude $A_2$ may be varied independently of each other. So $A_1$ may be equal to $A_2$ or may be different from $A_2$. Both amplitudes may vary between a minimum value which is slightly above value of the filament diameter (e.g. 1.05×d, which means almost no crimp), and a maximum value of about four to five times the filament diameter (4~5×d). This maximum value is dictated for reason of constructional stability.

Both the first crimp pitch $P_{c1}$ and the second crimp pitch $P_{c2}$ may be varied independently of each other. So $P_{c1}$ may be equal to $P_{c2}$ or may be different from $P_{c2}$. The more $P_{c1}$ differs from $P_{c2}$, the more easy it is to prevent the first crimp from tilting. Both pitches may vary between a minimum value which is about five times the filament diameter d (5×d), and a maximum value of about fifty times the filament diameter d (50×d). It is, however, to be preferred, that in twisted structures at least one, and most preferably both, of the crimp pitches is smaller than the twist pitch of the steel filament in the twisted structure.

Having regard to the above parameters which may be chosen quite freely, i.e. independent of each other, a large variety of wave forms can be obtained.

A first example is that by choosing $A_1$ equal to $A_2$ and $P_{c1}$ equal to $P_{c2}$ and by shifting the second crimp with a quarter of a pitch in respect of the first crimp, a spatial helix form can be obtained or at least be approximated without the need for driven rotatory preforming pins.

A second example is that by choosing A, substantially greater than $A_2$ an oval or elliptical transversal cross-section is obtained.

The steel filament 10 provided with the first and second crimp can be used as single steel filament, e.g. to reinforce the breaker ply of a rubber tyre.

The steel filament 10 provided with the first and second crimp can also be used in a more complex steel structure, next to other reinforcing elements. This more complex structure can be an untwisted structure or a twisted structure where two or more steel filaments are twisted with each other.

Conveniently, a twisted structure can be made in two ways which differ basically from each other. A first way, sometimes referred to as "cabling", is carried out by means of a rotary tubular strander. According to this technique, the individual steel filaments are not rotated around their own axis. This be derived, e.g. by means of a microscope, from non-rotating drawing lines (drawing lines are unavoidable imperfections caused by the final cold drawing steps in the relatively soft brass layer; these drawing steps conveniently immediately precede the twisting step).

A second way, sometimes referred to as "bunching", is carried out by means of a double-twister. According to this technique, the individual steel filaments are rotated around their own axes. This can be derived from rotating drawing lines. Both ways are known as such in the art.

The inventors have developed following procedure to detect whether or not a steel filament has been provided with a first crimp and a second crimp according to the invention.

If the structure has been "cabled", then the filaments are simply disentangled from the steel structure. If it is possible, e.g. by means of a microscope to discover on a disentangled filament     a) two crimps lying in different planes, e.g. by rotating the steel filament; or     b) two different crimp pitches; or     c) two different crimp amplitudes; or     d) any combination of a), b) or c), then this filament has been provided with a first crimp and a second crimp according to the invention.

If the structure has been "bunched", then the structure must be untwisted to such a degree that no applied torsions and no residual torsions are present any more. After this untwisting, one can proceed as for the "cabled" structures.

Of course other detection techniques can be developed. For example, a KEYENCE LS laser scan, such as disclosed in WO-A-95/16816, can be made of steel filaments and a Fourrier analysis can be applied. In case of "bunching" the bunching frequency can be filtered out and two crimp frequencies and their higher harmonics will remain.

FIGS. 4 to 8 all show transversal cross-sections of twisted steel structures which comprise one or more steel filament provided with a first crimp and a second crimp. The steel filaments provided with a first crimp and a second crimp are all referred to by reference number 10 and their cross-section is cross-hatched, whereas the cross-section of other steel filaments, if any, is only hatched obliquely in one direction.

Figure 4:
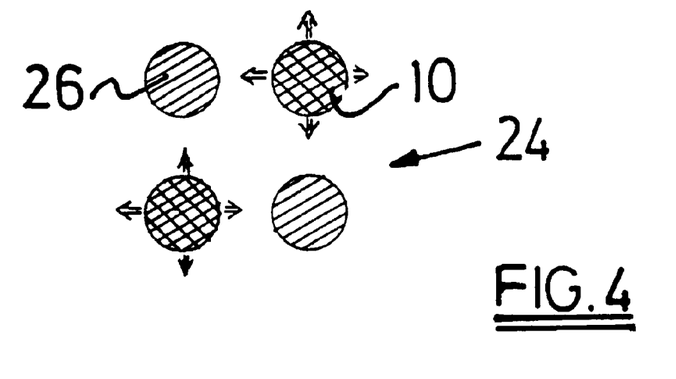
FIG. 4 shows a transversal cross-section of a 1×4 steel cord with two filaments provided with the first and the second crimp.

FIG. 4 shows the cross-section of a 4×0.28 steel cord 24. Two filaments 10 are provided with a first and a second crimp in order to allow rubber penetration into the steel cord 24 even if the steel cord 24 is put under a certain tensile load. Two filaments 26 are not provided with these crimps.

The number of filaments which should be provided with the crimps in order to promote rubber penetration depends upon the total number of filaments in the steel cord. The higher total number of filaments, the higher the number of filaments to be provided with the crimps.

The number of filaments which should be provided with the crimps in order to promote rubber penetration also depends upon the amplitude and the pitch of the crimps. Generally, the higher the amplitudes and the smaller the pitches, the more rubber is able to penetrate and the smaller the number of filaments provided with the crimps.

Figure 5:
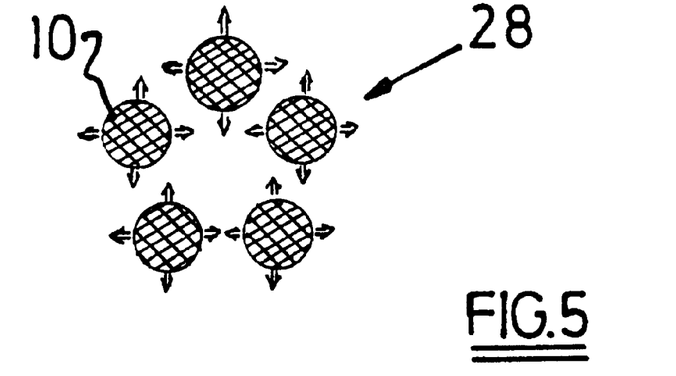
FIG. 5 shows a transversal cross-section of a 1 ×5 steel cord with all five filaments provided with the first and the second crimp.

FIG. 5 shows a cross-section of a 5×0.38 steel cord 28 where all the five steel filaments 10 are provided with the two crimps in order to obtain a high elongation at break (see results in table 5 hereafter).

Figure 6:
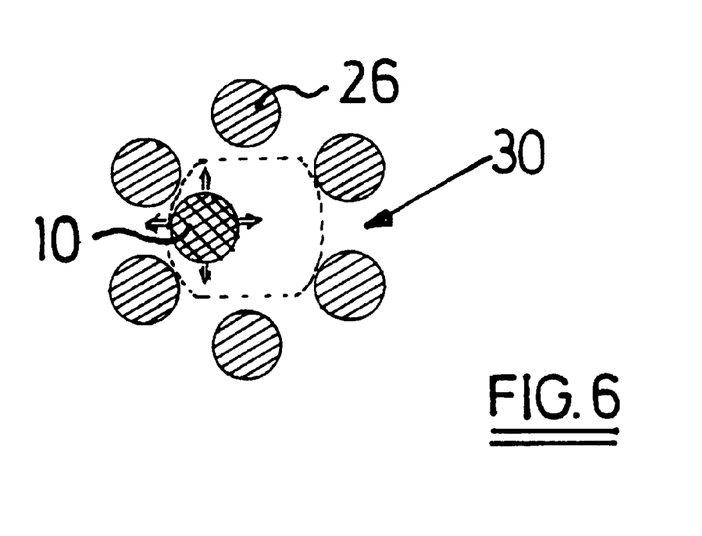
FIG. 6 shows a transversal cross-section of a 1+6 steel cord with the core filament provided with the first and the second crimp.

FIG. 6 shows a cross-section of a 1+6 steel cord 30 where the single core filament 10 is provided with the first and the second crimp. All filaments 26 of the layer surrounding the core filament 10 are not provided with those crimps. The first crimp amplitude is much greater than the second crimp amplitude of the core filament so that an oval cross-section of the steel cord can be obtained. In case it is desired that this oval shape does not rotate along the length of the steel cord, the core filament must not rotate in the final twisted steel cord. This is no problem if the cabling technique is applied. If the bunching technique is applied, use can be made of the teaching of EP-A1-0 676 500 to compensate for the rotating of the core filament around its own axis.

As an alternative of this embodiment, the core filament is provided with the first and the second crimp and the six filaments of the layer are provided with a polygonal form as has been disclosed in WO-A-95/1 6816.

As another alternative of this embodiment, both the core filament and the six outer filaments are provided with the first and the second crimp.

Figure 7:
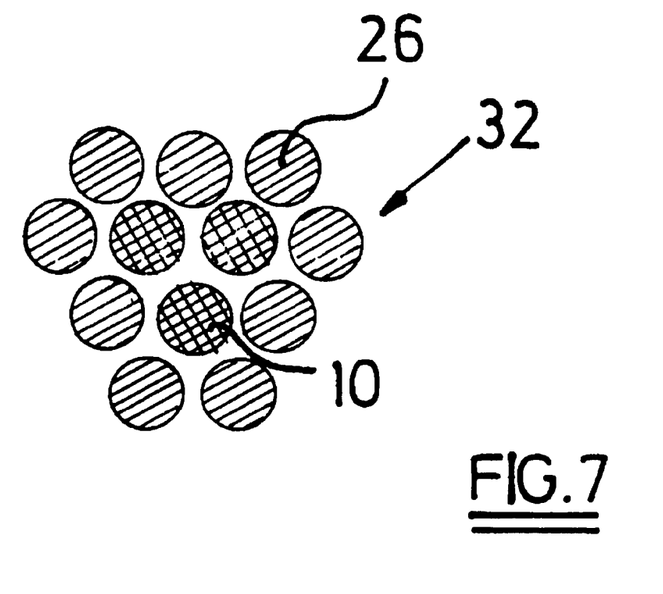
FIG. 7 shows a transversal cross-section of a 12×1 compact cord where the three central filaments are provided with the first and the second crimp.

FIG. 7 shows a cross-section of a 12×0.20 compact cord where the three central filaments 10 are provided with a first and a second crimp. The nine outer filaments 26 are not provided with these crimps. Dependent upon the crimp amplitudes and crimp pitches applied, the wavy form of the central filaments 10 can give the necessary rubber penetration to the compact steel cord without necessitating the use of central filaments which are thicker than the outer filaments. In case the rubber penetration is still not satisfactory, or in case a satisfactory rubber penetration requires too high a crimp amplitude, the nine outer filaments 26 may also be provided with a first and a second crimp.

Figure 8:
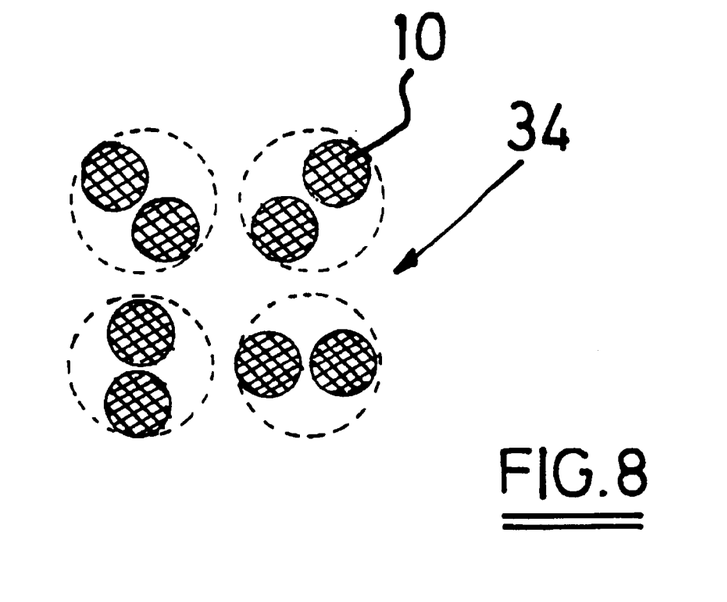
FIG. 8 shows a transversal cross-section of a 4×2 multi-strand cord where all filaments are provided with the first and the second crimp.

FIG. 8 shows a cross-section of a 4×2×0.35 elongation cord 34 where all composing filaments 10 are provided with a first and second crimp according to the invention. The twist pitch of the 0.35 filaments in the 2×0.35 strand can be increased from 3.5 mm to 6.0 mm and the twist pitch of the four 2×0.35 strands in the 4×2×0.35 cord can be increased from 9 mm to 16 mm without decreasing the elongation at fracture.

EXAMPLE 1

A first steel filament with a diameter of 0.28 mm has been provided with a first crimp with first crimp amplitude $A_1=0.50$ mm and first crimp pitch $P_{c1}=5.0$ mm, and with a second crimp with second crimp amplitude $A_2=0.50$ mm and with a second crimp pitch $P_{c2}=3.0$ mm.

A second steel filament with a diameter of 0.28 mm has been provided with a first crimp with first crimp amplitude $A_1=0.75$ mm and first crimp pitch $P_{c1}=5.0$ mm, and with a second crimp with second crimp amplitude $A_2=0.50$ mm and with a second crimp pitch $P_{c2}=3.0$ mm.

The above parameters $A_1$, $A_2$, $P_{c1}$ and $P_{c2}$ are all parameters as tuned on the crimp wheels. As may be derived hereinafter, the effective parameters as measured on the filaments may deviate from the parameters as tuned, e.g. because the second crimp influences the first crimp parameters. A possible downstream twisting of the filaments into a steel cord may also influence both the crimp amplitudes and the crimp pitches. Downstream operations usually decrease the crimp amplitudes and increase the crimp pitches.

Both filaments have been compared with a non-crimped steel filament of 0.28 mm diameter as reference.

TABLE 1

| 0.28 filament | | | |
|---|---|---|---|
| | Ref. filament | 1st filament | 2nd filament |
| Breaking load $F_m$ (N) | 157 | 145 | 145 |
| Elongation at break (%) | 1.5 | 4.1 | 6.0 |
| $A_1$ measured on filament (mm) | 0.280 | 0.455 | 0.796 |
| $P_{c1}$ measured on filament (mm) | 0.000 | 5.319 | 5.265 |
| $A_2$ measured on filament (mm) | 0.280 | 0.420 | 0.467 |
| $P_{c2}$ measured on filament (mm) | 0.000 | 3.126 | 3.119 |

Both the first filament and the second filament have been used to make four invention embodiments of a 4×0.28 steel cord with twisting pitch P=16.0 mm.

Embodiment no. 1 comprises one filament crimped as the first filament hereabove and three non-crimped filaments.

Embodiment no. 2 comprises two filaments crimped as the first filament hereabove and two non-crimped filaments.

Embodiment no. 3 comprises one filament crimped as the second filament hereabove and three non-crimped filaments.

Embodiment no. 4 comprises two filaments crimped as the second filament hereabove and two non-crimped filaments.

The four embodiments are compared with a reference 4×0.28 open cord with a twisting pitch of 16.0 mm.

TABLE 2

| | 4 × 0.28 cord | | | | |
|---|---|---|---|---|---|
| | Embodiment no. | | | | |
| | 1 | 2 | 3 | 4 | Ref. |
| breaking load $F_m$ (N) | 616 | 585 | 597 | 548 | 660 |
| tensile strength $R_m$ (MPa) | 2526 | 2397 | 2444 | 2239 | 2657 |
| E-modulus (MPa) | 178586 | 162527 | 167564 | 144043 | |
| permanent elongation at max. load (%) | 1.12 | 0.88 | 0.93 | 0.72 | |
| total elongation at break (%) | 2.5 | 2.4 | 2.4 | 2.3 | |
| yield strength at 0.2% permanent elongation (MPa) | 2074 | 1976 | 2074 | 1902 | |
| PLE cord at 50N (%) | 0.133 | 0.174 | 0.177 | 0.223 | 0.400 |
| PLE of crimped filament at 50N (%) | 0.840 | 0.574 | 1.179 | 1.210 | — |
| PLE of non-crimped filament at 50N (%) | 0.590 | 0.584 | 0.602 | 0.548 | |
| Rubber penetration % pressure drop | 0 | 0 | 0 | 0 | 0–20 |
| appearance rating inside cord (%) | 55 | 56 | 50 | 58 | |

The "part load elongation or PLE of a steel element (whether steel cord or steel filament) at 50 Newton" is defined as the increase in length of the steel element, which results from subjecting the steel element to a defined force of 50 Newton—and is expressed as a percentage of the initial length of the steel element measured under a defined pretension (of e.g. 2.5 Newton).

The rubber penetration has been measured in two ways. A first way is the convenient and wellknown pressure drop test. A second way determines the so-called appearance rating and is measured here on the core filament in the following way. The twisted cord is embedded in rubber under conditions comparable to manufacturing conditions. Thereafter the individual steel filaments are unraveled and the appearance rating is the surface area of a particular steel filament covered with rubber compared with the total surface area of that particular steel filament. In this measurement of the appearance rating, the numerical results are very dependent upon the type of rubber used.

EXAMPLE 2

A first high-tensile steel filament with a diameter of 0.38 mm has been provided with a first crimp with first crimp amplitude $A_1=1.0$ mm and first crimp pitch $P_{c1}=5.2$ mm, and with a second crimp with second crimp amplitude $A_2=0.75$ mm and with a second crimp pitch $P_{c2}=3.2$ mm.

A second high-tensile steel filament with a diameter of 0.38 mm has been provided with a first crimp with first crimp amplitude $A_1=1.0$ mm and first crimp pitch $P_{c1}=5.2$ mm, and with a second crimp with second crimp amplitude $A_2=0.50$ mm and with a second crimp pitch $P_{c2}=3.2$ mm.

A third high-tensile steel filament with a diameter of 0.38 mm has been provided with a first crimp with first crimp amplitude $A_1=0.75$ mm and first crimp pitch $P_{c1}=5.2$ mm, and with a second crimp with second crimp amplitude $A_2=0.75$ mm and with a second crimp pitch $P_{c2}=3.2$ mm.

The above parameters $A_1$, $A_2$, $P_{c1}$ and $P_{c2}$ are all parameters as tuned on the crimp wheels. As may be derived hereinafter from Table 3, the effective parameters as measured on the filaments may deviate from the parameters as tuned, e.g. because the second crimp influences the first crimp parameters. A possible downstream twisting of the filaments into a steel cord may also influence both the crimp amplitudes and the crimp

TABLE 3

0.38 mm filament

| | Ref. filament | 1st filament | 2nd filament | 3rd filament |
|---|---|---|---|---|
| Breaking load $F_m$ (N) | 312 | 267 | 279 | 271 |
| Elongation at break (%) | 1.5 | 10.11 | 6.54 | 7.10 |
| E-modulus (MPa) | 200000 | 44830 | 54777 | 80028 |
| $A_1$ measured on filament (mm) | 0.38 | 0.846 | 0.918 | 0.634 |
| $P_{c1}$ measured on filament (mm) | 0 | 5.143 | 5.170 | 5.198 |
| $A_2$ measured on filament (mm) | 0.38 | 0.684 | 0.497 | 0.621 |
| $P_{c2}$ measured on filament (mm) | 0 | 3.150 | 3.141 | 3.047 |

With the above-mentioned three types of high-tensile filaments nine 5×0.38 invention cords with twisting pitch 14.0 mm have been made according to table 4 hereunder where all of the steel filaments have been provided with both the first and the second

TABLE 4 filament composition of cords

| | Invention cord no. | | |
|---|---|---|---|
| Filament no. | no additional preforming | much additional preforming | some additional preforming |
| 1 | 1 | 4 | 7 |
| 2 | 2 | 5 | 8 |
| 3 | 3 | 6 | 9 |

Table 5 hereunder compares the results of these nine invention cords with a reference 5×0.38 high-tensile open steel cord with twisting pitch 12.0 mm.

TABLE 5

5 × 0.38 cord

| | Ref cord | Invention cord no. | | | | | | | | |
|---|---|---|---|---|---|---|---|---|---|---|
| | | 1 | 2 | 3 | 4 | 5 | 6 | 7 | 8 | 9 |
| linear density (g/m) | | 4.543 | 4.498 | 4.493 | 4.484 | 4.471 | 4.467 | 4.495 | 4.462 | 4.482 |
| max. diameter (mm) | | 1.495 | 1.239 | 1.236 | 1.412 | 1.402 | 1.296 | 1.334 | 1.277 | 1.310 |
| PLE cord at 50N (%) | | 0.261 | 0.204 | 0.153 | 0.378 | 0.341 | 0.337 | 0.260 | 0.228 | 0.269 |
| PLE filament at 50N (%) | | 1.568 | 1.289 | 1.194 | 1.484 | 1.363 | 1.327 | 1.418 | 1.186 | 1.331 |
| breaking load $F_m$ (N) | 1540 | 1308 | 1373 | 1331 | 1309 | 1408 | 1316 | 1305 | 1396 | 1347 |
| tensile strength $R_m$ (MPa) | 2686 | 2262 | 2400 | 2329 | 2295 | 2475 | 2316 | 2281 | 2459 | 2362 |
| E-modulus (MPa) | 193000 | 70773 | 98615 | 107267 | 105908 | 135309 | 138711 | 99710 | 155702 | 122695 |
| permanent elongation at max. load (%) | 1.7 | 3.95 | 1.83 | 2.89 | 2.52 | 1.58 | 1.78 | 2.74 | 1.29 | 2.32 |
| elongation at break (%) | 3.8 | 7.38 | 4.43 | 5.15 | 5.11 | 3.70 | 3.73 | 5.45 | 3.04 | 4.95 |
| yield strength at 0.2% permanent elongation (MPa) | 93 | 48 | 66 | 59 | 60 | 73 | 69 | 56 | 78 | 62 |
| rubber penetration (pressure drop - %) | 0 | 0 | 0 | 0 | 0 | 0 | 0 | 0 | 0 | 0 |
| Breaking load $F_m$ embedded in rubber (N) | 1667 | 1399 | 1508 | 1461 | 1376 | 1467 | 1356 | 1381 | 1506 | 1446 |

TABLE 5-continued

| | Ref cord | Invention cord no. | | | | | | | | |
|---|---|---|---|---|---|---|---|---|---|---|
| | | 1 | 2 | 3 | 4 | 5 | 6 | 7 | 8 | 9 |
| 5 × 0.38 cord | | | | | | | | | | |
| Total elongation at break embedded in rubber (%) | 2.09 | 6.39 | 3.33 | 4.3 | 3.21 | 1.93 | 1.98 | 3.8 | 1.95 | 3.59 |
| compression modulus (MPa) | 19000 | 26326 | 35590 | 65471 | 54423 | 65707 | 71853 | 54389 | 75526 | 64140 |
| deformation at instability $w_k$ (%) | 4.23 | 1.60 | 1.45 | 0.79 | 1.21 | 1.01 | 0.87 | 1.11 | 0.72 | 0.94 |

Following explanation can be given with respect to the values derived from a compression test. Due to their high length-to-diameter ratio steel cords as such have no resistance to compression. Once embedded in rubber, however, a steel cord can build up a considerable compression resistance. A cylinder test has been developed, which provides information on the compression properties of rubber-embedded steel cords.

A rubber cylinder with a diameter of 30 mm and a height of 48.25 mm is, reinforced exactly in the center with a test steel cord. By means of a precision mold and by tensioning the steel cord during curing, the cord is kept straight and exactly in the axis of the cylinder. The compression test records a force versus deformation diagram, $w_k$ is the deformation at instability or at the buckling point. Further details about the compression test may be read from L. BOURGOIS, Survey of Mechanical Properties of Steel Cord and Related Test Methods, Special Technical Publication 694, ASTM, 1980. A steel cord for protection plies is said to have a good compression behavior if $W_k$ exceeds 3%.

Figure 9:
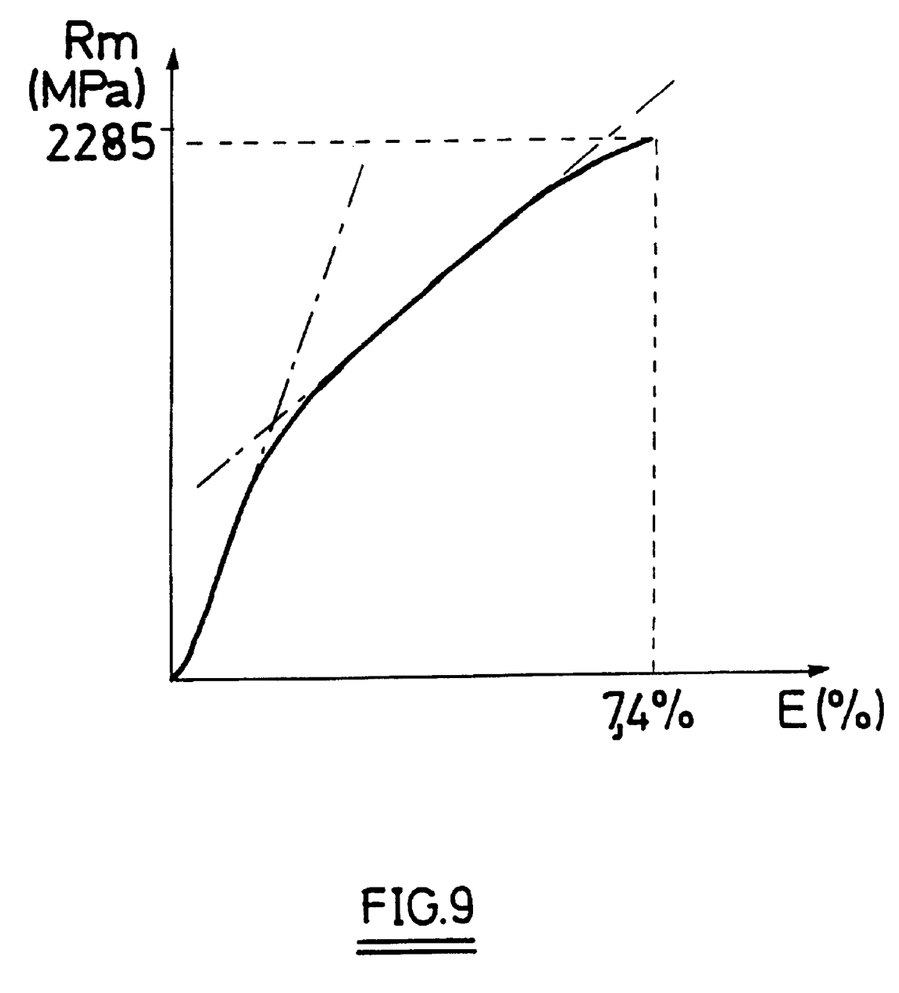
FIG. 9 shows a load-elongation curve of an invention 5×0.38 cord.

The values of the E-modulus or modulus of elasticity mentioned in Table 5 are average values. When performing a tensile test and recording a load-elongation curve, however, two different E-moduli can be observed. The two different E-moduli are a consequence of two crimps with different crimp pitches. In a tensile test, the crimp with the smaller crimp pitch leads to the elongation at the smaller loads, while the crimp with the greater crimp pitch only gives effective elongation at higher loads. This is shown in FIG. 9, which gives the load-elongation curve of invention cord no.1 of Table 5 hereabove. Two clearly distinct E-moduli are shown by means of point-dash lines.

EXAMPLE 3

A number of 0.22 mm filaments have been provided with the first and second crimp. Table 6 hereunder compares a number of their properties each time with a straight 0.22 mm filament as reference.

TABLE 6

| | 0.22 mm filament | | | | | |
|---|---|---|---|---|---|---|
| | 1st filament | | 2nd filament | | 3rd filament | |
| | Ref | 2x crimp | Ref | 2x crimp | Ref | 2x crimp |
| Breaking load (N) | 117 | 103 | 118 | 103 | 117 | 101 |
| tensile strength (MPa) | 3080 | 2711 | 3115 | 2705 | 3067 | 2669 |

TABLE 6-continued

| | 0.22 mm filament | | | | | |
|---|---|---|---|---|---|---|
| | 1st filament | | 2nd filament | | 3rd filament | |
| | Ref | 2x crimp | Ref | 2x crimp | Ref | 2x crimp |
| yield strength $R_p$ at 0.05% elongat. (MPa) | 2617 | 2053 | 2525 | 2022 | 2539 | 1985 |
| $R_p$ at 0.1% elongation (MPa) | 2839 | 2202 | 2851 | 2133 | 2798 | 2109 |
| Rp at 0.2% elongation (MPa) | 3005 | 2350 | 3029 | 2275 | 2975 | 2259 |
| elongation at max. load (%) | 0.38 | 0.95 | 0.45 | 0.96 | 0.45 | 0.94 |
| tot. elongation at fracture (%) | 1.88 | 3.48 | 1.9 | 4.3 | 1.91 | 3.84 |
| $A_1$ (mm) | 0 | 0.47 | 0 | 0.49 | 0 | 0.47 |
| $P_{c1}$ (mm) | | 5.20 | | 5.16 | | 5.31 |
| $A_2$ (mm) | 0 | 0.34 | 0 | 0.40 | 0 | 0.39 |
| $P_{c2}$ (mm) | | 3.04 | | 3.04 | | 3.12 |

EXAMPLE 4

A 12×0.38 compact cord has been manufactured with all twelve filaments provided with the double crimp. The cord can be used as weft element in a woven structure adapted to reinforce conveyor belts. Four embodiments of the 12×0.38 compact cord (CC) are compared with a conventional 4×7× 0.25 high-elongation (HE) cord. The differences between the four embodiments of the 12×0.38 compact cord are as follows:

Number 1: low winding tension, low rotation speed of buncher;

Number 2: high winding tension, low rotation speed of buncher;

Number 3: low winding tension, high rotation speed of buncher;

Number 4: high winding tension, high rotation speed of buncher.

TABLE 7

12 × 0.38 compact cord

| | 12 × 0.38 — invention | | | | 4 × 7 × 0.25 |
|---|---|---|---|---|---|
| | 1 | 2 | 3 | 4 | |
| Lay length (mm) | 18 S | 18 S | 18 S | 18 S | 5/10 SS |
| Rubber penetration | 0 | 0 | 0 | 0 | 100 |
| Pressure drop (%) | | | | | |
| Optical diameter | | | | | |
| $D_{min}$ | 2.105 | 1.940 | 1.888 | 1.910 | 1.879 |
| $D_{max}$ | 2.439 | 2.285 | 2.334 | 2.399 | 2.131 |
| Linear density (g/m) | 11.184 | 11.154 | 11.14 | 11.181 | 11.77 |
| Cross-sectional surface (mm²) | 1.42 | 1.42 | 1.42 | 1.41 | 1.50 |
| Tensile test on not embedded cord | | | | | |
| Breaking load (N) | 2856.7 | 2787.7 | 2840.7 | 2727.3 | 3149.7 |
| Tensile strength (MPa) | 2008 | 1965 | 2004 | 1928 | 2103 |
| E-modulus (MPa) | 44371 | 46998 | 49113 | 48907 | 101858 |
| yield strength at 0.01% elongation (MPa) | 630 | 708 | 661 | 688 | 1156 |
| Yield strength at 0.2% elongation (%) | 47 | 52 | 50 | 54 | 78 |
| Elongation at maximum load (%) | 3.35 | 2.94 | 3.29 | 2.79 | 2.45 |
| Total elongation at fracture (%) | 7.88 | 7.12 | 7.38 | 6.73 | 4.66 |
| Tensile test on cord embedded in rubber | | | | | |
| Breaking load (N) | 3023.47 | 2750.4 | 2905.07 | 2747.73 | 3345.07 |
| Tensile strength (MPa) | 2122 | 1936 | 2047 | 1940 | 2231 |
| E-modulus (MPa) | 65373 | 70380 | 71446 | 71508 | 117420 |
| yield strength at 0.2% elongation (MPa) | 1153 | 1183 | 1200 | 1219 | 2044 |
| yield strength at 0.2% elongation (%) | 54 | 61 | 59 | 63 | 92 |
| Elongation at maximum load (%) | 3.46 | 2.49 | 2.93 | 2.32 | 0.94 |
| Total elongation at fracture (%) | 6.71 | 5.24 | 5.8 | 5.05 | 2.91 |

EXAMPLE 5

A 4×0.30 cord and a 5×0.30 cord have been manufactured starting from 0.30 mm filaments which have all been provided with the double crimp. The amplitude of the first crimp as tuned on the toothed wheel was 0.70 mm and the pitch of the first crimp as tuned on the toothed wheel was 5.2 mm. The amplitude of the second crimp as tuned on the toothed wheel was 0.55 mm and the pitch of the second crimp as tuned on the toothed wheel was 3.2 mm. Table 8 hereunder summarizes the measured properties.

TABLE 8

4 × 0.30 and 5 × 0.30

| | 4 × 0.30 invention | 5 × 0.30 invention |
|---|---|---|
| lay length cord (mm) | 12.5 | 12.5 |
| linear density (g/m) | 2.255 | 2.824 |
| Surface of transversal cross-section (mm²) | 0.29 | 0.36 |
| Breaking load (N) | 787 | 972.3 |
| Tensile strength (MPa) | 2743 | 2706 |
| E-modulus | 115013 | 113222 |
| Yield strength at 0.01% elongation (MPa) | 1099 | 1091 |
| Yield strength at 0.2% elongation (MPa) | 1683 | 1707 |
| Yield strength at 0.2% elongation (%) | 61 | 63 |
| Elongation at maximum load (%) | 2.07 | 1.98 |
| Total elongation at fracture (%) | 4.46 | 4.37 |

In addition to the above-mentioned characteristics and properties, a steel cord according to the present invention has following features which make it able for the reinforcement of elastomers such as rubber:

the filament diameters range from 0.04 mm to 1.1 mm, more specifically from 0.15 mm to 0.60 mm, e.g. from 0.20 mm to 0.45 mm;

the steel composition generally comprises a minimjum carbon content of 0.60% (e.g. at least 0.80%, with a maximum of 1.1%), a manganese content ranging from 0.20 to 0.90% and a silicon content ranging from 0.10 to 0.90%; the sulphur and phosphorous contents are each preferably kept below 0.03%; additional elements such as chromium (up to 0.2 á0.4%), boron, cobalt, nickel, vanadium . . . may be added to the composition;

the filaments are conveniently covered with a corrosion resistant coating such as zinc or with a coating that promotes the adhesion to the rubber such as brass, or a so-called ternary brass such as copper-zinc-nickel (e.g. 64% 135.5% /0.5%) and copper-zinc-cobalt (e.g. 64% 135.7% /0.3%), or a copper-free adhesion layer such as zinc-cobalt or zinc-nickel.

The invention is suitable for all common and available final tensile strengths from 2150 mpa to about 3000 mpa and more.

What is claimed is:

1. A steel structure adapted for the reinforcement of elastomers, said steel structure comprising:

one or more steel elements which each comprise:

a bundle of non-twisted steel filaments, said steel filaments having a diameter ranging from 0.04 mm to 1.10 mm, said steel filaments having a steel composition comprising a minimum carbon content of 0.60%, a manganese content ranging from 0.20% to 0.90%, and a silicon content ranging from 0.10% to 0.90%, said steel filaments being covered with a corrosion resistant coating or with a coating that promotes the adhesion to rubber, at least one of said steel filaments being provided with a first crimp and a second crimp, the first crimp lying in a plane that is substantially different from the plane of the second crimp.

2. A steel structure adapted for the reinforcement of elastomers, said steel structure comprising:

one or more steel elements which each comprise:

a core and a layer of steel filaments twisted around the core, the core comprising one or more steel core filaments, at least one of the steel filaments of the core being provided with a first and second crimp in order to obtain rubber penetration in said core, the first crimp lying in a plane that is substantially different from the plane of the second crimp, the filaments of at least one of the layer and the core comprising at least one of a bundle of non-twisted steel filaments and a steel strand of twisted steel filaments, said steel filaments having a diameter ranging from 0.04 mm to 1.10 mm, said steel filaments having a steel composition comprising a minimum carbon content of 0.60%, a manganese content ranging from 0.20% to 0.90%, and a silicon content ranging from 0.10% to 0.90%, said steel filaments being covered with a corrosion resistant coating or with a coating that promotes the adhesion to rubber.

3. A steel structure adapted for the reinforcement of elastomers, said steel structure comprising:

one or more steel elements which each comprise between nine and twenty-seven steel filaments which all are twisted in the same twisting sense and with the same twisting pitch, some of said filaments being provided with a first and second crimp in order to obtain rubber penetration, the first crimp lying in a plane that is substantially different from the plane of the second crimp, said steel filaments having a diameter ranging from 0.04 mm to 1.10 mm, said steel filaments having a steel composition comprising a minimum carbon content of 0.60%, a manganese content ranging from 0.20% to 0.90%, and a silicon content ranging from 0.10% to 0.90%, said steel filaments being covered with a corrosion resistant coating or with a coating that promotes the adhesion to rubber.

4. A steel structure according to claim 3, wherein the steel elements of said structure each comprise central filaments, said central filaments being provided with said first and second crimp in order to prevent these filaments from migrating.

5. A steel structure according to claim 3, wherein the steel elements of said structure each comprise four strands, each of said strands comprising of two filaments, all of said filaments being provided with said first and second crimp in order to obtain an increased elongation at break.

* * * * *